June 11, 1946.  A. J. RAITCH  2,401,796
GARDEN TRACTOR
Filed May 17, 1943  4 Sheets-Sheet 2
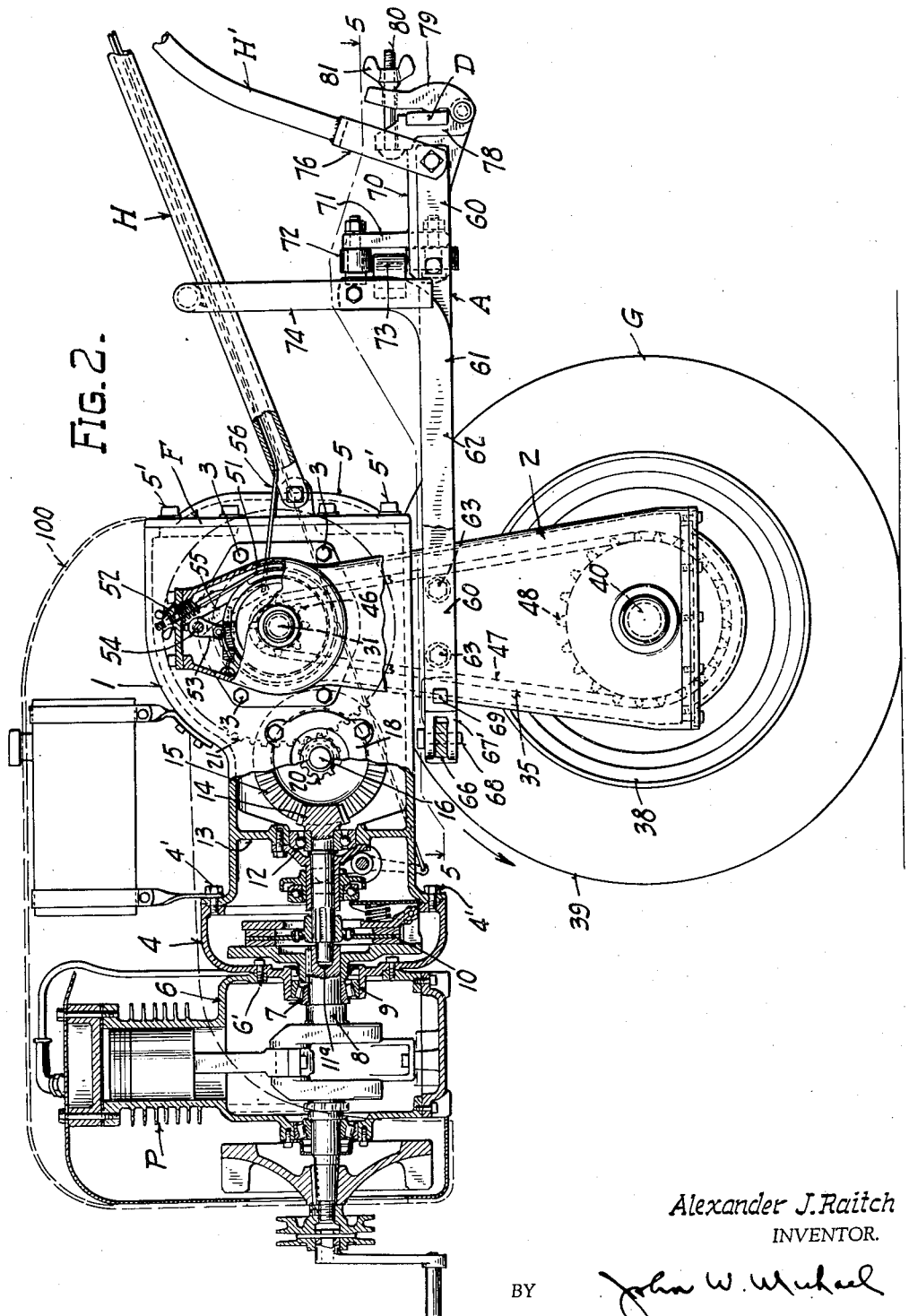
Alexander J. Raitch
INVENTOR.
BY John W. Michael
ATTORNEY

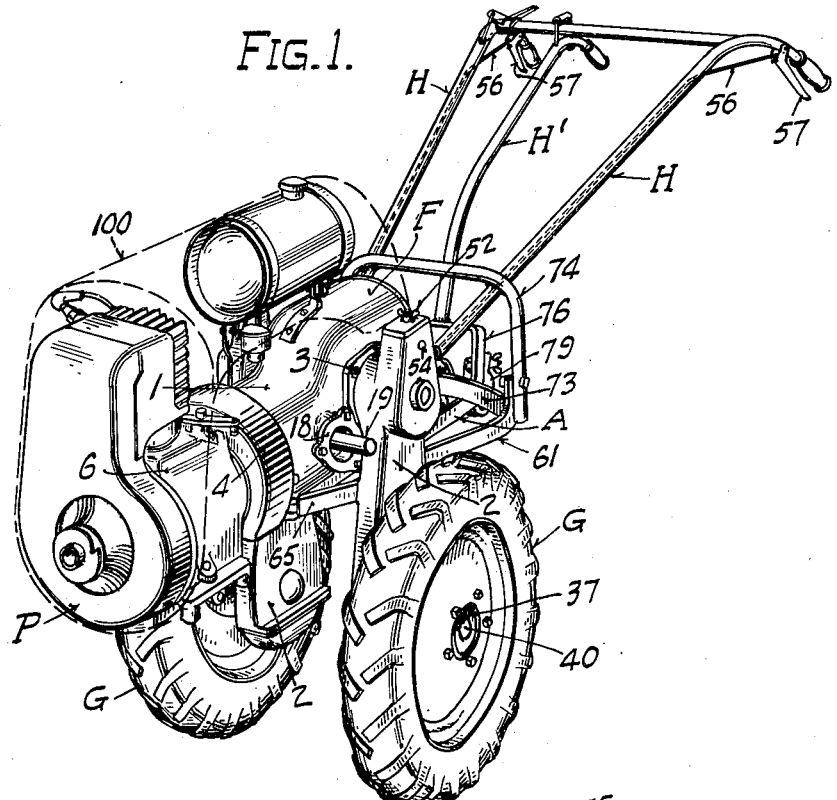
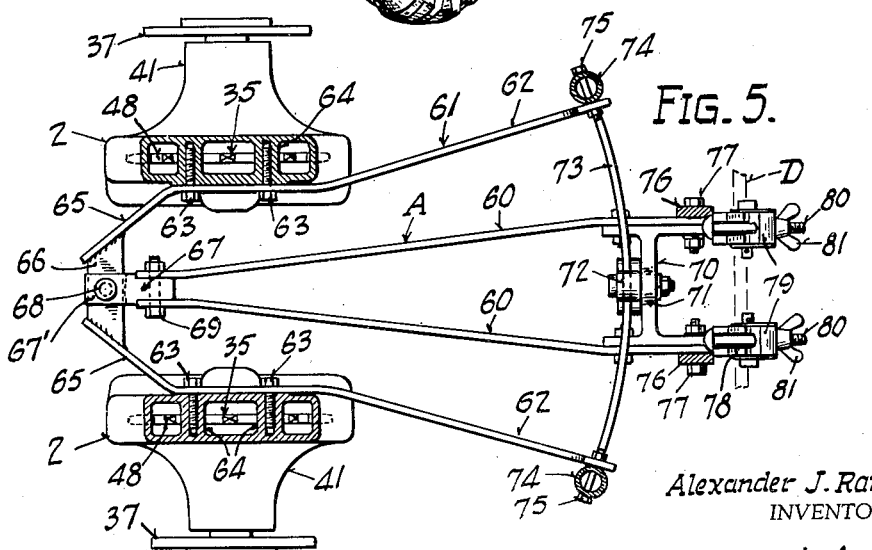

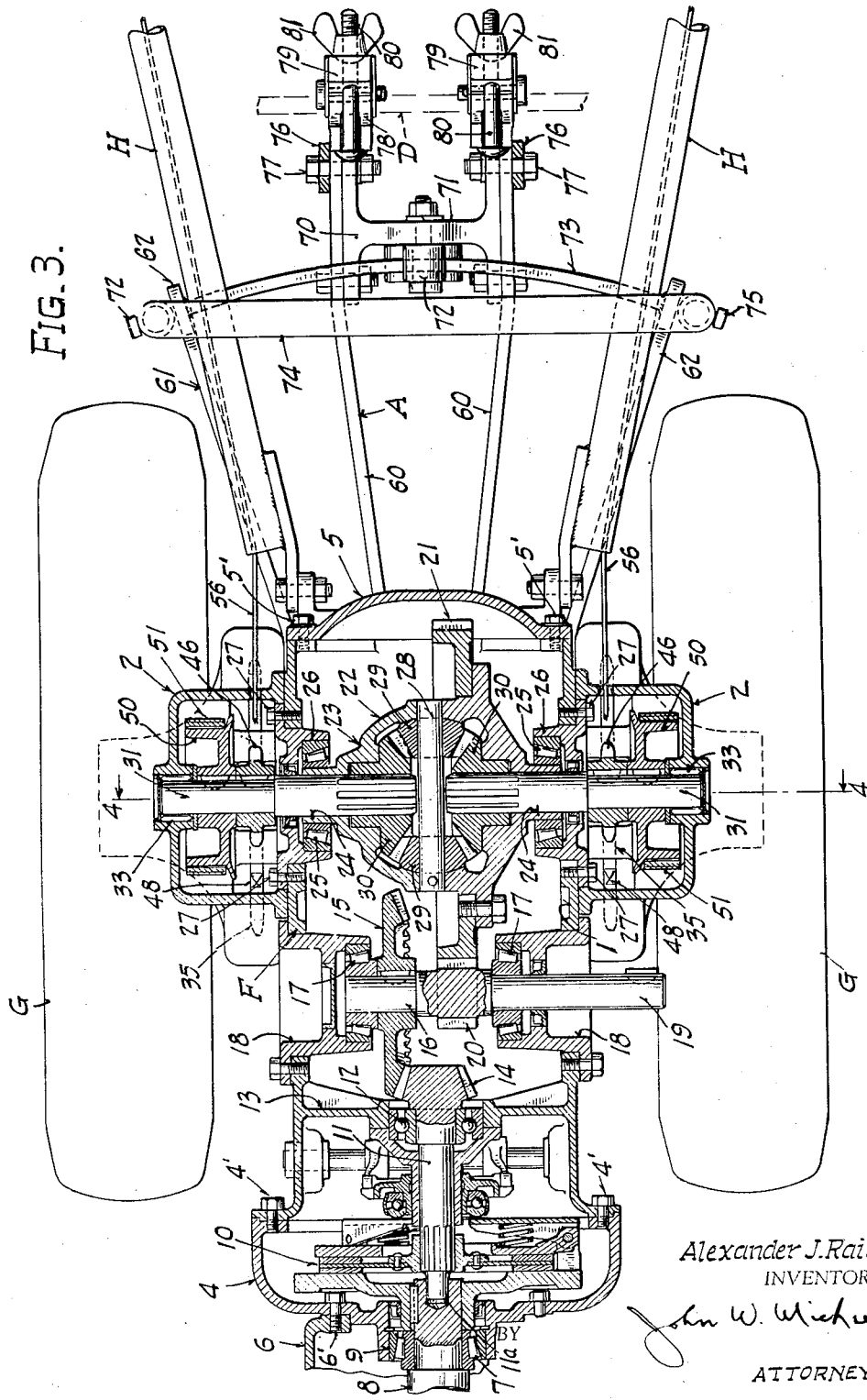

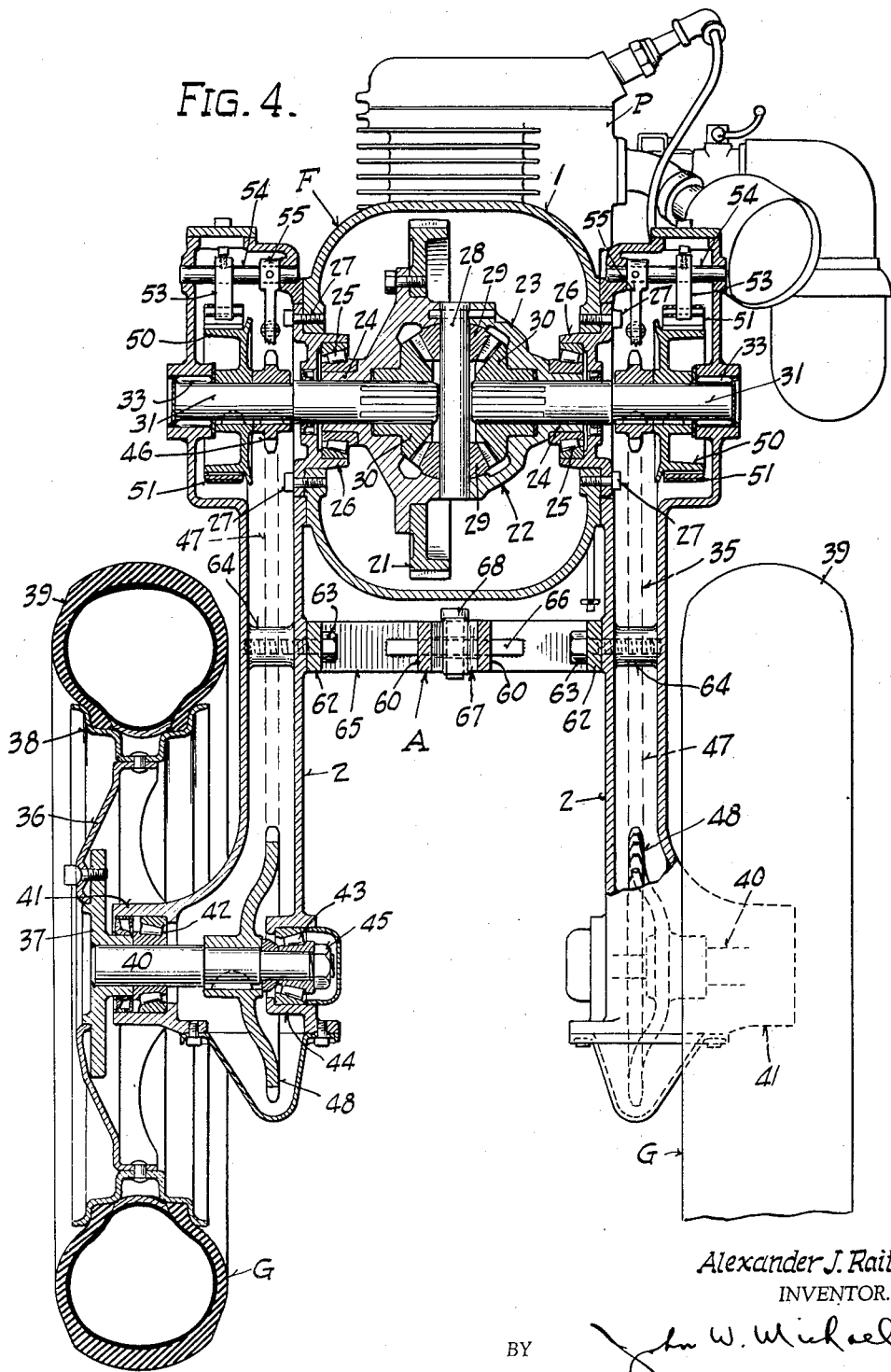

Patented June 11, 1946

2,401,796

UNITED STATES PATENT OFFICE 2,401,796

GARDEN TRACTOR

Alexander J. Raitch, Port Washington, Wis., assignor, by mesne assignments, to Automatic Products Company, Milwaukee, Wis., a corporation of Wisconsin Application May 17, 1943, Serial No. 487,210

2 Claims. (Cl. 180—19)

This invention relates to an improvement in garden tractors of the type used in seeding, weeding, and cultivating by growers of row crops.

Tractors of this character comprise a suitable frame, ground or traction wheels therefor, a prime mover, and some suitable form of motion transmission means for connecting the prime mover to the ground wheels.

The present invention proposes to improve, simplify, and compact a tractor of this general type, and at the same time render the machine more readily and easily controllable and more efficient in its action.

One of the features of the present invention is the novel way in which the frame is constituted and combined with the other elements of the tractor. The frame is so constituted as to serve not only the purpose of a frame, but also to act as a housing for elements of the motion transmission means which provides the driving connection between the prime mover and the ground or traction wheels. The construction is well balanced and is also advantageous in that while the tractor will straddle a row of crops, ground or traction wheels of moderate or even small size may be employed, the special frame construction giving the desired height. Savings in rubber are one of the advantages of this type of structure where rubber-tired wheels are employed.

Another object of the invention is to provide a tractor of this character, which is not only propelled over the ground by its prime mover, but which is also power-steered. The operator usually exercises control over the tractor by means of handles connecting the frame of the tractor and extending rearwardly and upwardly therefrom, but when turning the entire machine around, especially where the implements being pulled by the tractor are digging well into the ground, manual operation or control is difficult. In accordance with the present invention, such turning is accomplished by merely gripping a hand lever associated with each of the handles.

This ease of power turning is made possible by incorporating a differential in the drive line between the prime mover and the ground or traction wheels, providing a separate motion transmission train between each driven shaft of the differential and the ground or traction wheel which it drives, fixing a brake drum on each of said driven shafts, combining a brake band with each brake drum, constituting the mounting and operating means for each brake band so that the brake bands are biased to released or non-braking position and connecting each of the afore-mentioned hand levers with one such brake-operating mechanism so that when either hand lever is gripped and actuated, it will cause the brake band with which it is associated to move into braking engagement with its brake drum. In this way the motion of one ground or traction wheel is arrested while the power drive of the other continues. Smooth though rapid power steering or turning of the tractor results.

The hitch by which the implements are attached to the tractor is also of novel construction and is so combined in its special way with the tractor, and incidentally also is equipped with a separate handle, whereby the position of the implements may be conveniently controlled.

Other objects and advantages reside in certain novel features of the construction, arrangement, and combination of parts, which will be hereinafter more fully described and particularly pointed out in the appended claims, reference being had to the accompanying drawings forming a part of this specification, and in which:

Figure 1 is a perspective view showing a garden tractor embodying the present invention;

Figure 2 is a view thereof partly in central, vertical, longitudinal cross section and partly in side elevation, portions of the handles being broken away;

Figure 3 is a fragmentary view in horizontal cross section illustrating particularly the way in which the differential incorporated in the housing is driven, how the brakes are combined with the driven shafts of the differential, and also illustrating portions of the handles and the draw bar or hitch;

Figure 4 is a view in transverse, vertical cross section taken approximately on line 4—4 of Figure 3, parts being shown in elevation for the sake of illustration; and Figure 5 is a view in horizontal cross section taken on line 5—5 of Figure 2.

Referring to the drawings, it will be seen that a tractor embodying the present invention comprises generally a frame F supported on ground engaging or traction wheels G. The prime mover of the tractor, which may be an internal combustion engine, designated at P, is supported on the forward end of the frame F. Extending upwardly and rearwardly from the rearward end of the frame are a pair of handles H. A separate handle H' is provided for controlling the lateral position of the implements not shown, these implements being attached to a draw bar designated diagrammatically at D (see Figures 3 and 5) and connected to the frame of the tractor by hitch or draw bar connection A.

The frame F comprises a substantially horizontally disposed main section 1 of tubular or bell-shaped form and a pair of hollow legs 2 of substantial extent vertically, the legs 2 being disposed on the opposite sides of the main tubular frame section 1. The upper ends of the legs 2 are fixedly secured, as by means of screws 3, to the opposite side walls of the tubular main section 1. The lower ends of the legs 2 are supported on the ground or traction wheels G in a manner which will be hereinafter described.

Caps or end plates 4 and 5 close the front and rear openings respectively of the tubular main frame section 1. Screws 4' and 5' releasably secure the caps 4 and 5 to the ends of the tubular main frame section 1.

The crank case 6 of the prime mover or internal combustion engine P is bolted as at 6' to the cap 4 at the forward end of the tubular main section 1 of the frame F. One of the main bearings 7 for the crank shaft 8 of the engine P is supported in a flanged central opening 9 provided in the cap 4.

A friction clutch 10 of the disc type, and of any suitable standard or conventional construction, is employed to interconnect controllably the crank shaft 8 of the engine P and a short shaft 11.

The forward end of the shaft 11 is piloted in the crank shaft 8 as shown at 11a. Adjacent its rearward end, the shaft 11 is also supported for rotation in a ball bearing assembly 12 carried by the central opening of an internal partition 13 of the tubular main section 1 of the frame F. The extreme rear end of the shaft 11 is provided with a beveled pinion 14 meshing with a beveled gear 15 fixed to a cross shaft 16 supported for rotation in suitable bearing assemblies 17 mounted in bearing carriers 18 fixedly though detachably secured to the side walls of the tubular main section 1 of the frame F. One end of the cross shaft 16 projects beyond the adjacent side wall of the frame section 1, as illustrated at 19 in Figures 1 and 3, to provide a power take-off.

A pinion 20 is integrally formed with or otherwise suitably fixed to the portion of the cross shaft 16 located between its bearings 17. The pinion 20 meshes with and drives the master ring gear 21 of a differential designated generally at 22.

The differential 22 may be of any suitable, standard or conventional construction. As shown, it comprises a cage or housing 23 having tubular end trunnions 24 rotatably supported in roller bearing assemblies 25 mounted in bearing carriers 26 fixedly though detachably secured to the side walls of the main housing section 1 as by means of screws 27. The master ring gear 21 is bolted to the housing 23 and when driven by its pinion 20 rotates the housing 23 bodily. A shaft 28 pinned to the housing 23 and extending diametrically of the same supports the beveled planet pinions 29 of the differential for bodily rotation with the housing 23 and also for rotation about their own axis. The beveled planet pinions 29 mesh with bevel gears 30 splined to the inner ends of the driven shafts 31 of the differential. The driven shafts 31 extend through the tubular end trunnions 24 of the housing 23 and project into the interior of the upper ends of the hollow legs 2 of the frame F. Bearings 25, mounted on the bearing carrier 26 and on the outer walls of the hollow legs 2, respectively, support the driven shafts 31 of the differential for rotation.

The upper end of the hollow supporting legs 2 are enlarged, as illustrated in the drawings, to accommodate the drive line between the driven shafts 31 of the differential 22 and the braking mechanism combined with these shafts, all to be hereinafter more fully described.

The driving mechanism between each driven shaft 31 of the differential 22 and the underlying ground or traction wheel G comprises chain and sprocket gearing, designated generally at 35. This feature of the construction is well illustrated in Figure 4 of the drawings. The lower ends of the hollow supporting legs 2 are designed and adapted to have supporting connection with the ground or traction wheels G. These wheels G may take various forms, but one advantageous type of construction is shown in the drawings, and as there shown comprises a disk wheel having a body plate 36 to which a hub 37 is suitably fastened. The periphery of the body plate 36 of the wheel is attached to a rim 38 on which a pneumatic tire 39 is mounted in some suitable standard or conventional way. The central flanged opening of the hub 37 is fixed to an axle 40. The lower end of each hollow leg is fashioned, that is, dimensioned, proportioned, and shaped to provide supports for the bearings in which the axle 40 is rotatably mounted. This is accomplished by forming an outwardly projecting cylindrical extension 41 integral with the lower end of each hollow leg 2 and machining and adapting such extension to provide the mounting for bearing assemblies 42 in which the outer end of the axle is rotatably interfitted. Axially alined with the bearing assemblies 42 are inner bearing assemblies 43 carried by a suitably formed bearing receiving opening 44 provided in the inner wall of the lower end of each of the hollow legs 2. A nut 45 threaded on the inner end of each axle 40 and coacting with the inner member of the bearing assembly 43 takes care of the thrust in one direction. The flange of the hub 37 coacts with one of the inner race members of the bearing assemblies 42 to oppose the thrust in the other direction.

The chain and sprocket gearing 35 previously referred to, and employed for the purpose of separately transmitting the drive from each driven shaft of the differential to the underlying axle of the ground or traction wheel to be driven, comprises a driving sprocket 46 fixed to each driven shaft 31 of the differential 22 and meshing with a sprocket chain 47 which extends down to its hollow leg 2 and also meshes with a driven sprocket 48 keyed or otherwise fixed to the underlying axle 40.

With the structure as above described, when the motor or prime mover P is running, and the clutch 10 engaged, the ground or traction wheels G will be driven through the differential 22 and the chain and sprocket gearing 35 in automotive fashion.

In order that the tractor may be power steered, a brake drum 50 is fixed to each driven shaft 31 of the differential 22. A brake band 51 encircles each brake drum 50. The brake band is combined with some suitable mounting and operating mechanism so constituted that the brake band 51 is normally biased to released position, provision being made for necessary adjustment as wear ensues. As illustrated diagrammatically in Figure 2, one end of the brake band is adjustably supported, as at 52, on the top plate of the tubular or hollow leg 2 which encloses it. The other end of the brake band 51 is pivotally connected to a rocker arm 53 fixed to a rock shaft 54 supported for rocking movement in bearings provided in the opposed walls of the upper end of the associated hollow or tubular leg 2. Also fixed to this rock shaft 54 is a crank arm 55 connected by means of a wire or other suitable flexible element 56 with hand grips or hand levers 57 pivotally mounted on the handles H adjacent the portions thereof which the operator of the machine grasps.

With this construction, when the machine is to be turned or power steered, all that the operator is required to do is to grip one of the hand levers 57. This applies the brake with which such hand lever 57 is associated. As a consequence, the movement of one of the ground traction wheels G is arrested while the other continues to be power-driven. Manifestly, the machine is then turned in the selected direction.

The earth-working implements (not shown) are attached in any suitable conventional or standard fashion to the draw bar D illustrated diagrammatically in dotted lines in Figures 3 and 5. The draw bar is fixedly although quickly detachably connected to the draw frame A comprising a pair of bars 60 which are disposed in the same horizontal plane but diverge from each other and extend rearwardly from the machine. This draw frame A is combined with a handle frame, designated generally at 61, and also comprising a pair of bar-like frame members 62, the forward portions of which are fixedly attached to intermediate portions of the tubular legs 2 by means of bolts 63, the bolts being threaded through bolt-receiving bosses 64 integral with the opposite walls of the tubular legs 2. Forwardly of the points of attachment of the frame member 62 to the tubular legs 2 frame members 62 are bent or inclined toward each other, as indicated at 65, and are cross-connected by a cross plate 66 which may be welded to the forward inclined portions of the bars 62 of the handle frame. The forward ends of the draw bar 60 of the hitch or draw frame A have a universal connection, designated generally at 67, with this cross plate 66 so that the draw bar 60 may be moved laterally and vertically. The universal connection 67 may comprise a clevis 67' pivotally attached at its forward end, as at 68, to the cross plate 66 for movement about a vertical axis and pivotally attached, as at 69, at its rearward end to the forward ends of the draw bars 60 for movement about a horizontal axis. The rear ends of the draw bars 60 are cross-connected by an I-shaped bracket 70 bolted to the draw bars 60. The bracket 70 has centrally atached thereto a short vertical standard 71 provided at its upper end with a roller 72 which rides on an arcuate rail 73 spanning and secured at its ends to the frame bars 62 of the handle frame 61.

The outer ends of the rail 73 are fitted in and project through openings provided therefor in the rear ends of the bar 62 of the handle frame, and also extend through openings provided in the depending legs of a U-shaped connecting member or bail 74. Nuts 75 fasten the rail 73 to the bar 62 and to the legs of the bail 74. The bail 74 also is engaged with the handles H to strengthen and reinforce the structure and to complete the organization thereof.

The handle H', provided to control the lateral positioning of the earth-working implements, has its lower end formed with an integral bail or fork 76 which straddles the rearward ends of the draw bar 60 and is fixed to the rearward ends thereof and to flanges of the bracket 70 by means of bolts and nuts 77. The quickly detachable connection provided between the draw bar D and the hitch or draw frame A may be of any suitable construction, but is illustrated as being constituted of slotted keeper plates or seats 78 fastened to the rearward ends of the draw bars 60 and to the adjacent flanges of the I-bracket 70, and completed by clamp levers 79 pivoted to the lower ends of the keeper 78 and adjustable into clamping engagement with the draw bar D by means of bolts 80 and wing nuts 81.

For the purpose of protecting the operating elements against the effect of dirt, dust, and weather, a suitable sheet metal enclosing casing 100 may be provided to fit over the upper parts of the structure, as illustrated in dotted lines in Figures 1 and 2. This enclosing structure or case, of course, is releasably attached to stationary parts of the tractor.

While I have shown and described one construction in which the invention may be advantageously embodied, it is to be understood that the construction shown has been selected merely for the purpose of illustration or example, and that various changes in the size, shape, and arrangement of parts may be made without departing from the spirit of the invention or the scope of the subjoined claims.

I claim:

1. A tractor comprising a combination frame and housing, legs depending from the opposite sides of the combination frame and housing, ground wheels rotatably supported on the lower ends of the legs, a prime mover carried by the housing, a power transmission mechanism enclosed within the housing and the legs and actuated by the prime mover for driving the ground wheels, and an implement hitch having its forward end secured to intermediate portions of the legs and bracing the legs against movement laterally of the tractor longitudinal axis.

2. A tractor comprising a combination frame and housing, legs depending from the opposite sides of the combination frame and housing, ground wheels rotatably supported on the lower ends of the legs, a prime mover carried by the housing, a power transmission mechanism enclosed within the housing and the legs and actuated by the prime mover for driving the ground wheels, and an implement hitch having its forward end secured to intermediate portions of the legs, a draw-bar movably connected with the hitch, a pair of handles secured to the housing for steering the tractor, and a separate handle mounted on the steering handles for shifting the draw-bar laterally of the longitudinal axis of the tractor to control the position of the implements carried thereby.

ALEXANDER J. RAITCH.